US010552909B2

(12) United States Patent
Kreider et al.

(10) Patent No.: US 10,552,909 B2
(45) Date of Patent: Feb. 4, 2020

(54) FUND OF FUNDS ANALYSIS TOOL

(76) Inventors: Jonathan Kreider, Broomfield, CO (US); Peter R. Ormsbee, Centennial, CO (US)

(*) Notice: Subject to any disclaimer, the term of this patent is extended or adjusted under 35 U.S.C. 154(b) by 951 days.

(21) Appl. No.: 12/765,365

(22) Filed: Apr. 22, 2010

(65) Prior Publication Data

US 2011/0264600 A1 Oct. 27, 2011

(51) Int. Cl.
*G06Q 40/06* (2012.01)

(52) U.S. Cl.
CPC .................................. *G06Q 40/06* (2013.01)

(58) Field of Classification Search
CPC ..................................................... G06Q 40/06
USPC .................................................. 705/35–36 R
See application file for complete search history.

(56) References Cited

U.S. PATENT DOCUMENTS

| | | | | |
|---|---|---|---|---|
| 2002/0198821 | A1* | 12/2002 | Munoz ................ | G06Q 40/025 705/38 |
| 2009/0281959 | A1* | 11/2009 | Abidi et al. ............... | 705/36 R |
| 2009/0327155 | A1* | 12/2009 | Dial et al. .................. | 705/36 R |
| 2010/0100502 | A1* | 4/2010 | Gerber ....................... | 705/36 R |
| 2010/0131423 | A1* | 5/2010 | Meyer et al. .............. | 705/36 R |

OTHER PUBLICATIONS

Evaluation of Target Date Funds, Scott Warlow 2008.*
Target Date Funds: Historical Volatility/ Return Profiles; Oct. 23, 2009; Deloitte; Advanced Analytical Consulting Group.*
Life-Cycle Funds Mature: Plan Sponsor and Participant Adoption, vol. 20 Nov. 2005.*
Target Date Funds, Deloitte, Oct. 23, 2009; Michael J Brien, Philip J Cross, Constantijn Panis.*
Investopedia Definition.*
Cisneros-Molina, M., H. Huang, and T. Salisbury. "Evaluation of Target Date Funds." (2008).*
Deloitte Target Date Funds; Historical Volatility/ Return Profiles; Michael Brien et al.*
Stephanie. "Statistics How to." (2009).*
Allocations at retirement, Looking to Target Date Funds to Determine Appropriate Equity/Fixed Income allocations at Retirement; Jan. 2009; Jonathan Kreider.*
Glide Path and dynamic asset allocation of target date funds; Jan. 5, 2010 by Youngjun Yoon.*
Life-Cycle Funds Mature: Plan Sponsor and Participant Adoption, vol. 20 Nov. 2005: Plan and participant adoption. Nearly two thirds of Vanguard® DC plans offered lifecycle funds in 2005.*
WebArchive_11182009_How to Do Everything Statistics » How to Find a Linear Regression Equation.*
Poon, Ser-Huang, and Clive WJ Granger. "Forecasting volatility in financial markets: A review." Journal of economic literature 41, No. 2 (2003): 478-539 (Year: 2003).*

(Continued)

*Primary Examiner* — Peter Ludwig
*Assistant Examiner* — James H Miller
(74) *Attorney, Agent, or Firm* — Duncan Galloway Egan Greenwald, PLLC; Kevin T. Duncan

(57) ABSTRACT

Systems and techniques are disclosed to analyze fund of funds investments. The system is configured to provide at least one objective analytic that indicates the level of risk associated with a fund of funds investment strategy. The system provides both a quantitative and qualitative risk measurement value using actual portfolio holdings data of underlying funds that can be used to compare multi-faceted investment portfolios.

39 Claims, 13 Drawing Sheets

(56) References Cited

OTHER PUBLICATIONS

Cisneros-Molina, M., H. Huang, and T. Salisbury. "Evaluation of Target Date Funds." (2008). (Year: 2008).*
Deloitte Target Date Funds; Historical Volatility/ Return Profiles; Michael Brien et al. (Year: 2009).*
Stephanie. "Statistics How to." (2009) (Year: 2009).*
Allocations at retirement, Looking to Target Date Funds to Determine Appropriate Equity/Fixed Income allocations atRetirement; Jan. 2009; Jonathan Kreider (Year: 2009).*
Glide Path and dynamic asset allocation of target date funds; Jan. 5, 2010 by Youngjun Yoon (Year: 2010).*
Life-Cycle Funds Mature: Plan Sponsor and Participant Adoption, vol. 20 Nov. 2005: Plan and participant adoption. Nearly two thirds of Vanguard® DC plans offered lifecycle funds in 2005 (Year: 2005).*
WebArchive_11182009_How to Do Everything Statistics » How to Find a Linear Regression Equation (Year: 2009).*

\* cited by examiner

Volatility Premium = 0.084
Vol-Free Rate = 0.363/month

IMLC Expected Return = 0.363 + 0.084*(4.83) = 0.768/mo

| Lipper Classification Average | Std Deviation | Calculated Expected Return Monthly | Calculated Expected Return (Annualized) |
|---|---|---|---|
| International Multi-Cap Core | 4.83 | 0.768 | 9.621 |
| Large-Cap Growth | 4.76 | 0.762 | 9.532 |
| Small-Cap Value | 4.73 | 0.760 | 9.519 |
| Global Large-Cap Growth | 4.72 | 0.759 | 9.502 |
| International Large-Cap Growth | 4.70 | 0.758 | 9.477 |
| International Multi-Cap Core | 4.68 | 0.755 | 9.472 |
| International Large-Cap Core | 4.64 | 0.754 | 9.410 |
| International Large-Cap Value | 4.63 | 0.752 | 9.407 |
| Mid-Cap Core | 4.62 | 0.750 | 9.395 |
| International Multi-Cap Value | 4.53 | 0.743 | 9.299 |
| S&P 500 Index Funds | 4.30 | 0.724 | 9.046 |
| Mid-Cap Value | 4.27 | 0.721 | 9.005 |
| Global Large-Cap Value | 4.26 | 0.720 | 8.993 |
| Multi-Cap Core | 4.24 | 0.718 | 8.963 |
| Global Large-Cap Core | 4.23 | 0.717 | 8.971 |
| Large-Cap Core | 4.11 | 0.708 | 8.836 |
| Global Multi-Cap Value | 4.10 | 0.707 | 8.828 |
| Global Multi-Cap Core | 4.08 | 0.705 | 8.813 |

FIGURE 7

Family 1 TDF Allocation – Month 122

| Fund | Class | Weight | Exp Return (Monthly) | Exp Return (Annually) |
|---|---|---|---|---|
| Family 1 Large-Cap Fund | LCCE | 30% | 0.708 | 8.830 |
| Family 1 Small-Cap Fund | SCGE | 27% | 0.897 | 11.310 |
| Family 1 International Fund | IMLC | 25% | 0.757 | 9.470 |
| Family 1 Emerging Markets Fund | EM | 10% | 0.907 | 11.440 |
| Family 1 Corp Bond Fund | BBB | 3% | 0.490 | 6.040 |
| Family 1 High Yield Fund | HY | 3% | 0.563 | 6.970 |
| Family 1 Govt Bond Fund | GUS | 2% | 0.469 | 5.770 |
| Weighted Expected Return | | | 0.775 | 9.720 |

FIGURE 8A

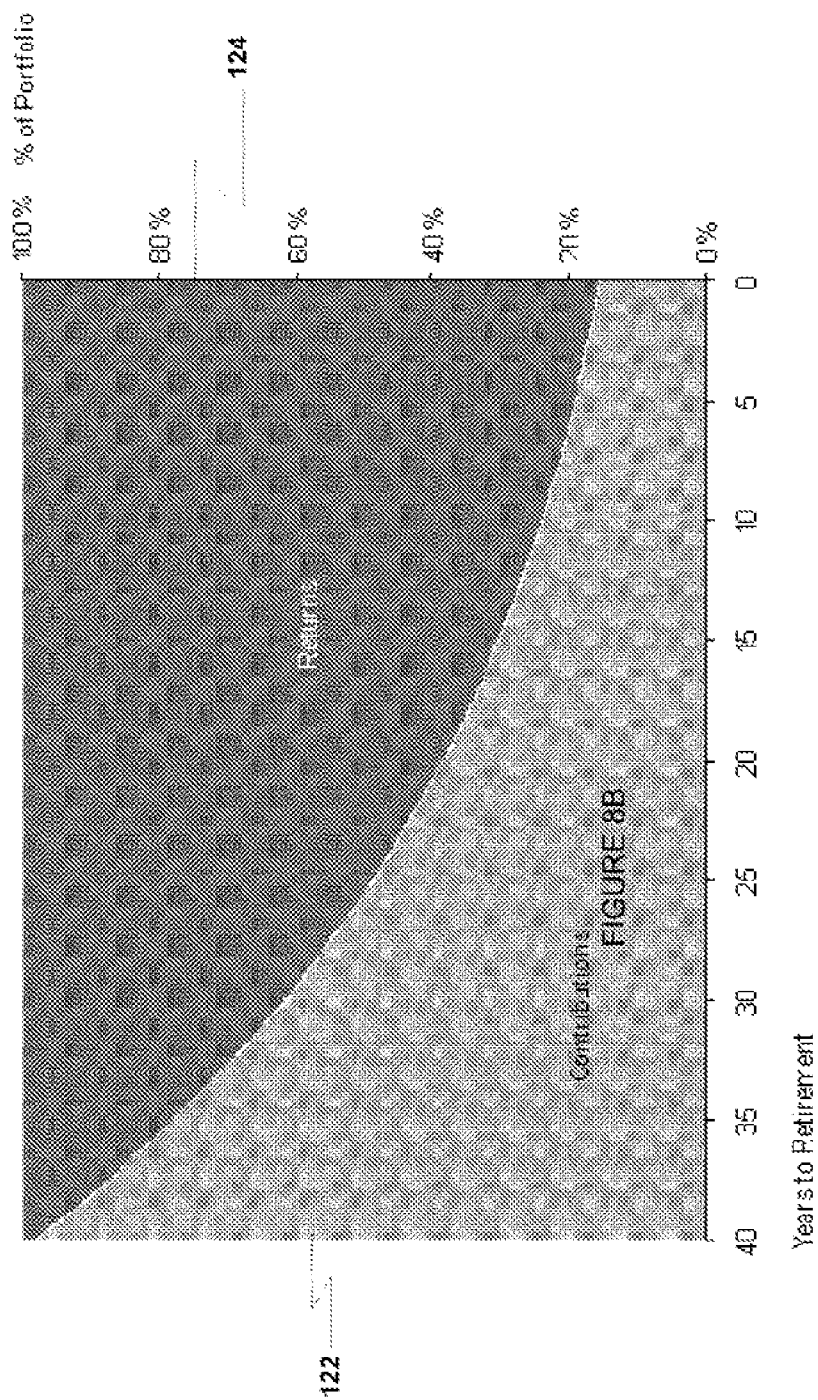

| IDENTIFIERS | RANGES |
|---|---|
| Aggressive | 3.51 – 100.00 |
| Moderately Aggressive | 3.46 – 3.50 |
| Moderate | 3.12 – 3.45 |
| Moderately Conservative | 3.00 – 3.11 |
| Conservative | 0.00 – 2.99 |

FIGURE 11

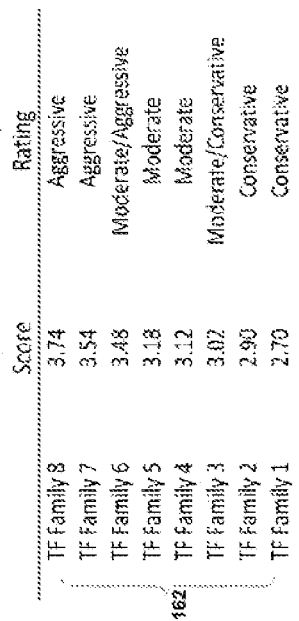
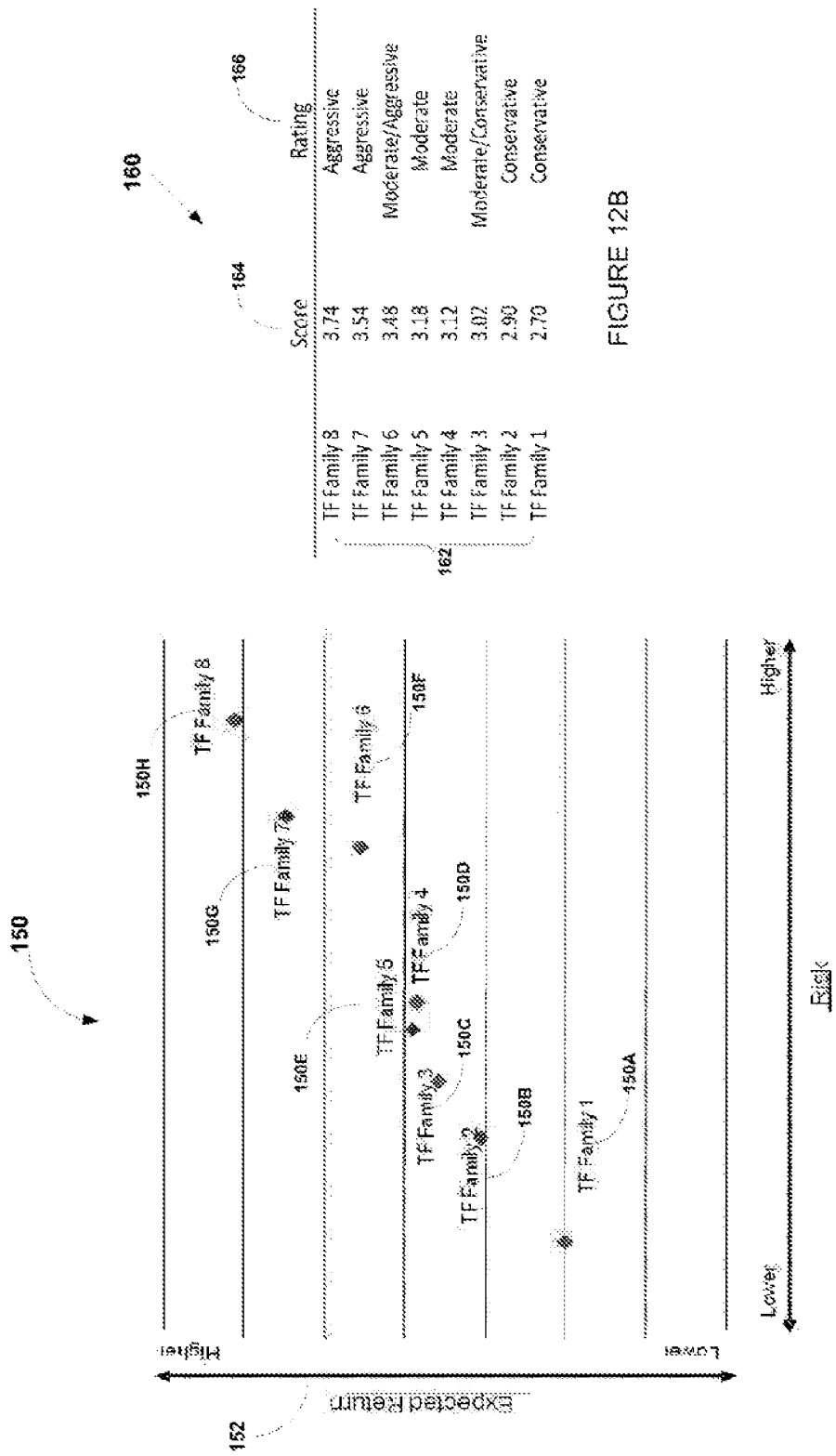
FIGURE 12B
FIGURE 12A

FUND OF FUNDS ANALYSIS TOOL

TECHNICAL FIELD

This disclosure relates to financial risk measurement, and more particularly to systems and methods for computing risk measures associated with fund of funds investments.

BACKGROUND

Fund of funds (FoF) investments have become increasingly popular over the years. Companies and organizations that assume financial responsibility for individuals and groups, such as plan sponsors and advisers, use FoF investments to diversify risk. FoF investments hold a portfolio of other investment funds rather than investing directly in stocks, bonds, or other securities. One type of FoF investment that has garnered increased interest by plan sponsors, advisors, as well as individuals, is a target date fund (TDF). A TDF is a type of mutual fund structured by an entity (e.g., investment firm, mutual fund company, insurance company, and the like.) that automatically rebalances its portfolio to a more conservative asset allocation as a specific date target approaches (e.g., a retirement date).

Entities typically create TDFs in a series, each TDF of the series having a different target date and portfolio mix selected from other funds provided by the entity. In addition, each TDF of the series shares a common glide path, which is a formula that describes how portfolio allocations for each TDF change over time.

While TDFs can improve overall investment and retirement planning, there is an increased need among plan sponsors, advisors, and investors for independent analysis and ratings of TDF series. As each TDF of a series shares the same glide path, there is a need to objectively quantify the risk associated with performance of these funds over the glide path to ensure consistency with investment objectives.

Further, there is a need to understand the risk levels of a series of target date funds on a relative basis, as the glide paths of TDFs having same target dates can vary greatly between investment firms. For example, some entities assume that participants desire a high degree of safety and liquidity, and therefore include more fixed income securities than other asset classes in their TDFs, while other entities assume that participants will hold onto the TDFs, and therefore include more equity securities in their TDFs, reflecting more potential for both risk and reward along a longer time horizon.

Accordingly, there is a need for improved systems and techniques for analyzing and comparing fund of funds investments.

SUMMARY

Systems and techniques are disclosed to analyze fund of funds investments. The system is configured to provide at least one objective analytic that indicates the level of risk associated with a fund of funds investment strategy. The system provides both a quantitative and qualitative risk measurement value using actual portfolio holdings data of underlying funds that can be used to compare multi-faceted investment portfolios.

Various aspects of the system relate to computing risk measurement values for an entity based on return volatility of fund assets.

For example, according to one aspect, a computer-implemented method includes identifying a first fund, the first fund having a glide path and a first volatility of return value, identifying a second fund, the second fund having the glide path and a second volatility of return value, the first fund and the second fund being associated with an entity, and computing a risk score associated with the entity based upon the first volatility of return value and the second volatility of return value. The method also includes generating a signal associated with the risk score, and transmitting the signal.

In one implementation, the step of computing the risk score includes weighting the first volatility of return value by a corresponding expected account balance for the first fund, weighting the second volatility of return value by a corresponding expected account balance for the second fund, and summing the weighted first and second volatility of return values. In some implementations, the first and the second funds are target date funds, and each of the target date funds includes a plurality of mutual funds. The method also may include displaying graphically a plurality of computed risk scores associated with different entities on a display device.

In another implementation, the method includes computing the first and the second volatility of return values based on historical rate of return values and expected rate of return values that are associated with asset classifications corresponding to assets underlying the glide path. The method can also include generating the historical rate of return values by computing a standard deviation of asset classification returns for each of the asset classifications over a time interval.

The method can also include averaging the computed standard deviation of asset classification returns for each asset classification over the time interval, averaging asset classification returns for each asset classification over the time interval, and then computing a volatility premium and volatility free rate for each of the first and second funds using the averaged asset classification returns, averaged standard deviation of asset classification returns, and a data regression technique. Computing the expected rate of return values for each asset classification can include multiplying the computed volatility premium by the averaged standard deviation of asset classification returns, and summing the volatility free rate to the multiplied amount.

In yet another implementation, the method includes calculating a weighted average expected return along the time interval of the glide path by multiplying the calculated expected rate of return values of each asset classification by a proportion of the asset classification allocated in each fund over the time interval, and then summing the multiplied amounts.

A system, as well as articles that include a machine-readable medium storing machine-readable instructions for implementing the various techniques, are disclosed. Details of various implementations are discussed in greater detail below.

In some implementations, one or more of the following advantages may be present. For example, the system can provide objective and independent analysis of a series of fund of funds investments. As each series of fund of funds is associated with a risk score, the system can provide a comparison of risk associated with series of fund of funds provided by different entities. This can be particularly advantageous when plan sponsors and/or advisors wish to ensure that risks undertaken by entities are consistent with plan and/or client demographics.

Another advantage relates to scalability. For example, the system can be utilized to analyze not only target date funds, but a wide array of fund of funds investments that may be suitable to investors.

A further benefit of the system relates to accuracy: For example, the system relies on the long-term performance of asset classifications underlying funds, not short or mid-term performance of asset classifications, thereby minimizing the effect of asset classification return anomalies on computed risk scores.

Additional features and advantages will be readily apparent from the following detailed description, the accompanying drawings and the claims.

BRIEF DESCRIPTION OF THE DRAWINGS

FIG. 7 illustrates an exemplary calculation of expected returns for asset classifications.

FIGS. 8A-8B illustrate weighted average portfolio expected returns.

FIG. 9 illustrates an exemplary account balance over a time interval.

FIG. 11 illustrates exemplary identifiers for association with a computed risk score.

FIGS. 12A-12B illustrate rating scores for a plurality of entities.

Like reference symbols in the various drawings indicate like elements.

DETAILED DESCRIPTION

Figure 1:
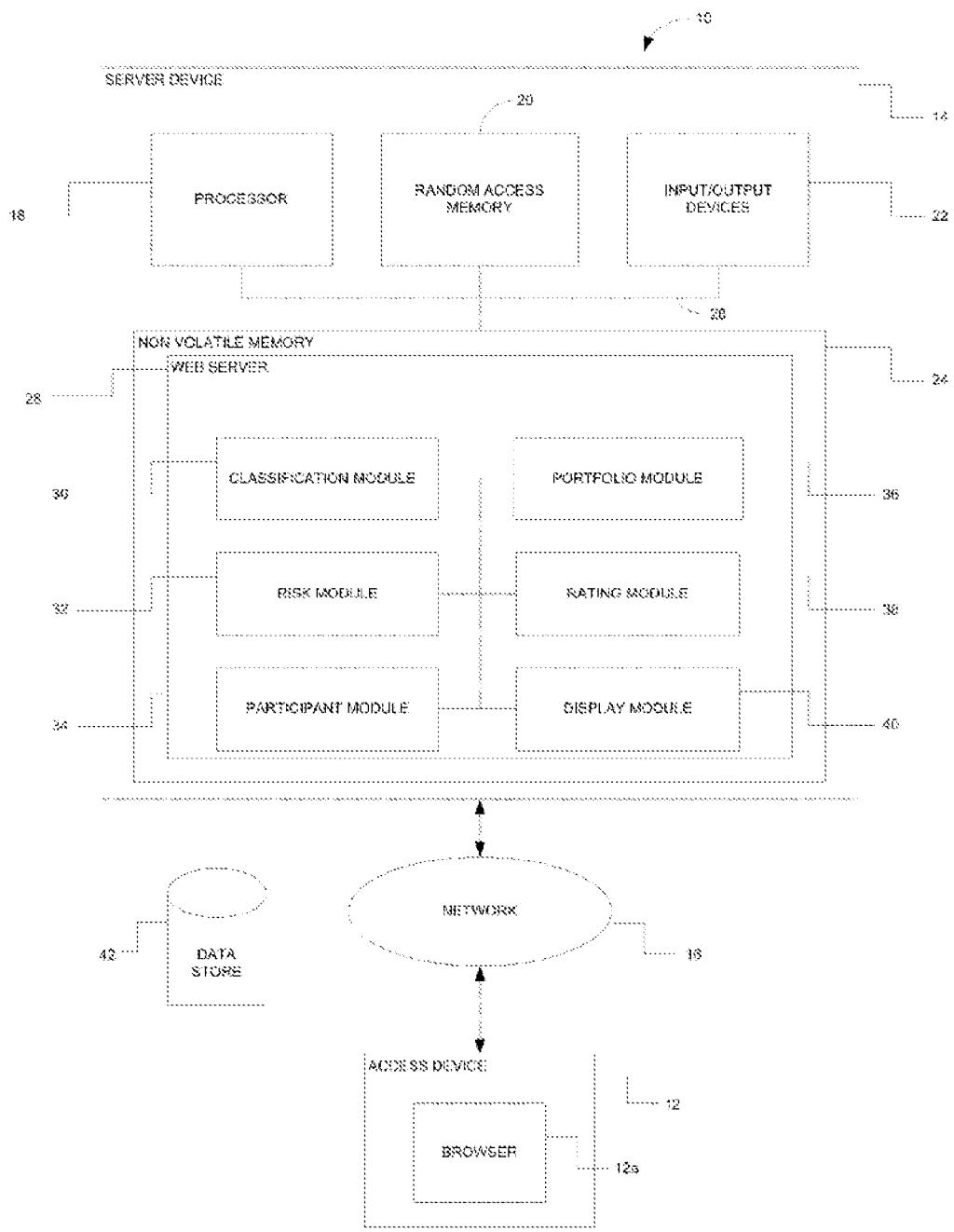
FIG. 1 is a schematic of an exemplary computer-based fund of funds analysis system.

FIG. 1 shows a computer-based system for analyzing fund of funds investments. The system 10 is configured to calculate a risk level for a series of target date funds (TDFs) associated with an entity in response to a request. As used herein, the phrase "series of target date funds" and "series of TDFs" refer to a plurality of target date funds that share a common glide path. Although the example discussed below relates to TDFs, it will be appreciated by one skilled in the art that the systems and techniques disclosed herein can be utilized across various types of fund of funds investments. Example fund of funds (FoF) investments that can be analyzed with the system 10 include, but are not limited to, mutual fund FoF, hedge fund FoF, private equity FoF, investment trust FoF, and combinations thereof.

As shown in FIG. 1, in one implementation, the system 10 is configured to include an access device 12 that is in communication with a server 14 over a network 16. The access device 12 can include a personal computer, laptop computer, or other type of electronic device, such as a cellular phone or Personal Digital Assistant (PDA). In one embodiment, for example, the access device 12 is coupled to I/O devices (not shown) that include a keyboard in combination with a pointing device such as a mouse for sending web page requests to the server 14. Preferably, memory of the access device 12 is configured to include a browser 12A that is used to request and receive information from the server 14. Although only one access device 12 is shown in FIG. 1, the system can support multiple access devices.

The network 16 can include various devices such as routers, server, and switching elements connected in an Intranet, Extranet or Internet configuration. In some implementations, the network 16 uses wired communications to transfer information between the access device 12 and the server 14. In another embodiment, the network 16 employs wireless communication protocols. In yet other embodiments, the network 16 employs a combination of wired and wireless technologies.

As shown in FIG. 1, in one implementation, the server device 14 preferably includes a processor 18, such as a central processing unit ('CPU'), random access memory ('RAM') 20, input-output devices 22, such as a display device (not shown) and keyboard (not shown), and non-volatile memory 24, all of which are interconnected via a common bus 26 and controlled by the processor 18. In one implementation, as shown in the FIG. 1 example, the non-volatile memory 24 is configured to include a web server 28 for processing requests from the access device.

The web server 28 is configured to send requested web pages to the browser 12A of the access device 12 in response to a web page request. The web server 28 communicates with the web browser 12A using one or more communication protocols, such as HTTP (Hyper Text Markup Language). In one embodiment, the web server 28 is configured to include the Java 2 Platform, Enterprise Edition ('J2EE') for providing a plurality of screens included in a user interface displayed on the browser 12A.

The web server 28 provides a run-time environment that includes software modules for computing risk levels associated with fund of funds (FoF) investments. As shown in FIG. 1, in one implementation, the run-time environment includes a classification module 30 to categorize assets underlying each fund of the series of TDFs, a risk module 32 to compute a risk score for one or more series of TDFs, a participant module 34 to compute expected account balances for each fund of the series of TDFs, a portfolio module 36 to compute a portfolio expected return, a rating module 38 to associate computed risk scores with qualitative identifiers, and a display module 40 to display computed risk scores and qualitative identifiers associated with an entity. Details of the software modules 30, 32, 34, 36, 38, 40 configured in the run-time environment are discussed in further detail below.

In one implementation, as shown in FIG. 1, a data store 42 is provided that is utilized by software modules 30, 32, 34, 36, 38, 40 to access and store information relating to individual TDFs, as well as the series of TDFs. In one implementation, the data store 44 is a relational database. In another implementation, the data store 42 is a directory server, such as a Lightweight Directory Access Protocol ('LDAP') server. In yet other implementations, the data store 42 is a configured area in the non-volatile memory 24 of the device server 14. Although the data store 42 shown in FIG. 1 is connected to the network 16, it will be appreciated by one skilled in the art that the data store 42 can be distributed across various servers and be accessible to the server 14 over the network 16, or alternatively, coupled directly to the server 14, or be configured in an area of non-volatile memory 24 of the server 14.

It should be noted that the system 10 shown in FIG. 1 is one implementation of the disclosure. Other system implementations of the disclosure may include additional structures that are not shown, such as secondary storage and additional computational devices. In addition, various other implementations of the disclosure include fewer structures than those shown in FIG. 1. For example, in one implementation, the disclosure is implemented on a single computing device in a non-networked standalone configuration. Data input is communicated to the computing device via an input device, such as a keyboard and/or mouse. Data output of the system is communicated from the computing device to a display device, such as a computer monitor.

Figure 2:
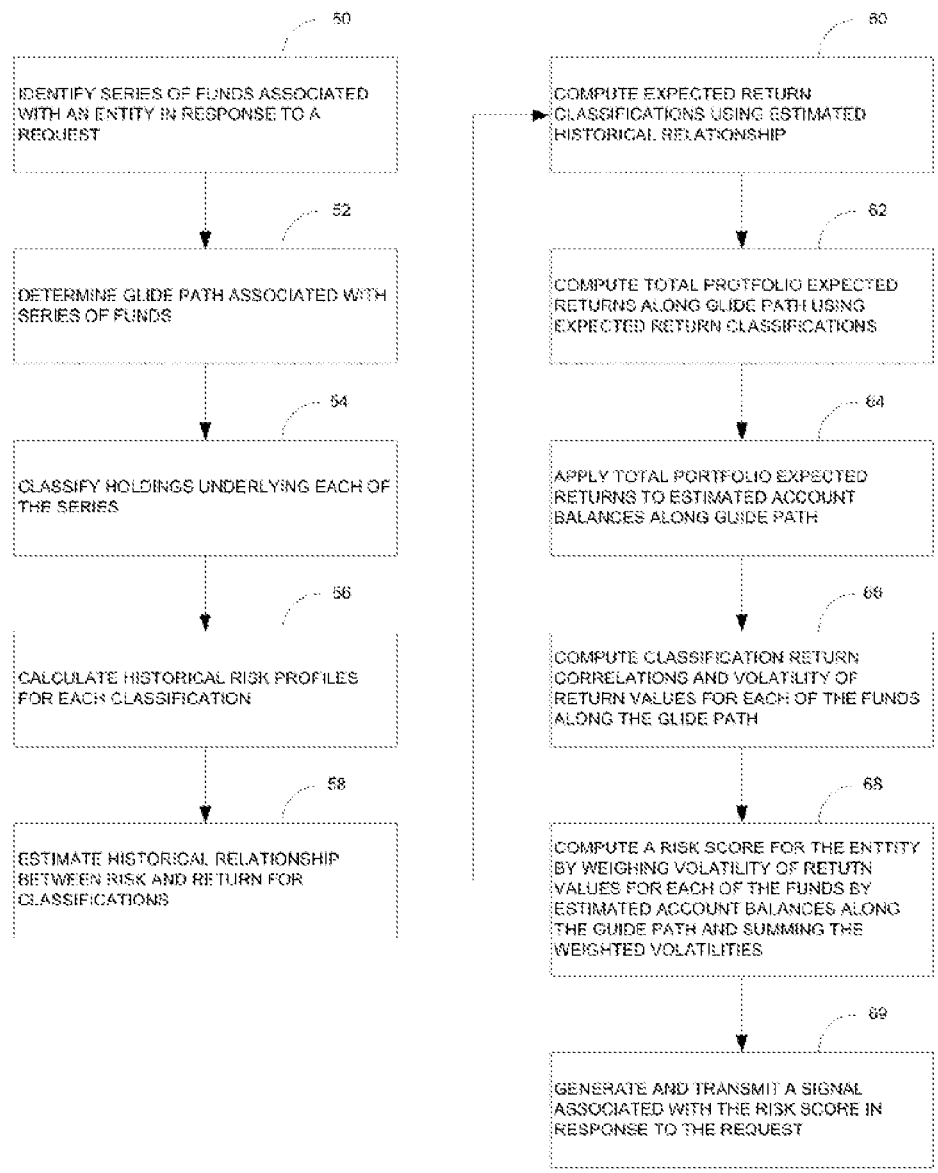
FIG. 2 illustrates an exemplary method for calculating a risk score.

Turning now to FIG. 2, a method of calculating a risk score associated with an entity is disclosed. In one implementation, for example, steps 50, 52, 56, 58, 60 and 64-69 of FIG. 2 are executed by the risk module 32 of FIG. 1. Step 54 of the method is executed by the classification module 30 of FIG. 1, and step 62 is executed by the portfolio module 36 of FIG. 1. Output from the participant module 34 of FIG. 1 is used by the risk module in step 64, and the signal generated by the risk module 32 in step 69 optionally includes output from the rating module 38 shown in FIG. 1.

As shown in FIG. 2, in one implementation, the risk module 32 identifies a series of TDFs provided by an entity in response to a request 50. As used herein, the term 'entity' refers to any investment firm, mutual fund company, insurance company, or the like, that provides a fund of funds (FoF) investment In one implementation, the fund of funds investment is a target date fund.

Various techniques may be employed by the system 10 to receive requests. For example, in one implementation, the request is sent from the browser 12A and identifies the entity that provides the FoF investment. In the non-networked stand alone configuration described previously, the request is received from one of the input/output devices 22 included in the server device 14 and identifies the entity that provides the FoF investment. Accordingly, both the network 16 and the access device 12 shown in FIG. 1 are not required structures in the non-networked stand alone implementation. In yet other implementations, the request includes one or more entities that provide FoF investments.

Next, as shown in FIG. 2, the risk module 32 determines a glide path for the series of funds 52. As described previously, each TDF of a series of TDFs shares a common glide path, which describes a portfolio allocation mix for each TDF of the series of TDFs at various time intervals. In one implementation, the risk module 32 accesses the glide path associated with a series of TDFs from the data store 42.

Figure 3:
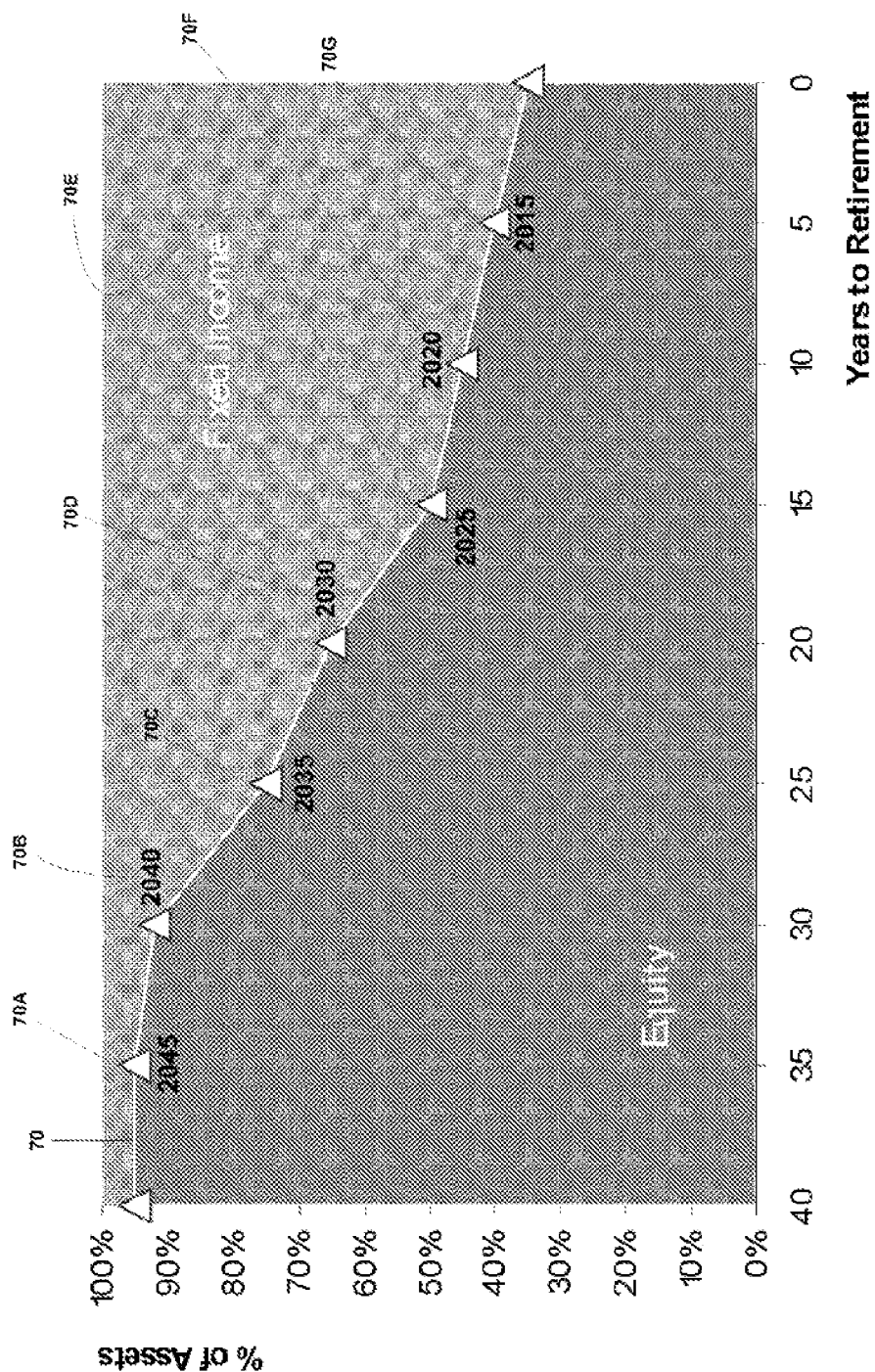
FIG. 3 illustrates an exemplary glide path shared for a series of target date funds.

In appreciation of the present invention, an example glide path 70 for a series of TDFs is shown in connection with FIG. 3. Each TDF 70A-F of the series of TDFs utilizes the glide path 70 to determine the percentage of underlying funds (e.g., equity, fixed income, etc.) to include in each TDF portfolio. Notably, as time proceeds forward, the portfolio allocation mix of a first TDF having a later target date approaches that of a TDF in the same series having an earlier target date. For example, in the example shown in FIG. 3, the portfolio allocation mix of the 2040 TDF 70B will approximate the portfolio allocation mix of the 2015 TDF 70G over time.

Figures 4A, 4B:
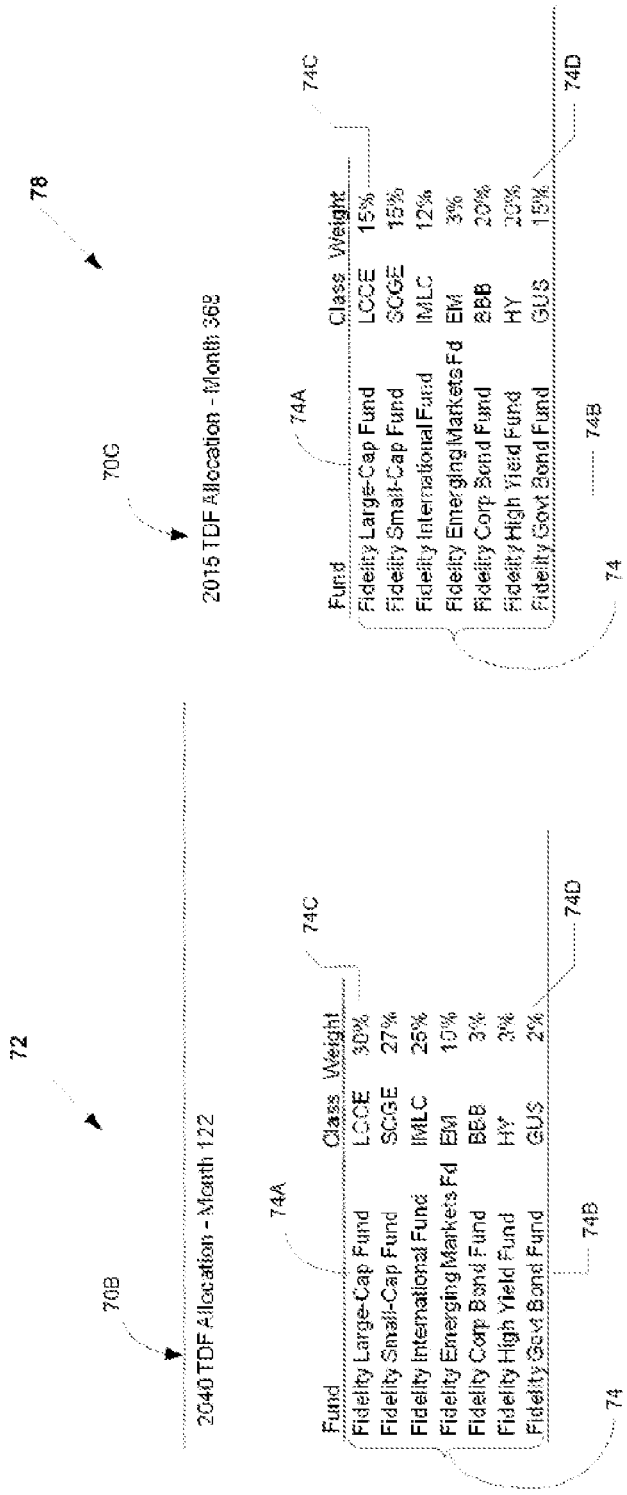
FIGS. 4A-4B illustrate asset allocations for two target date funds shown in FIG. 3.

Turning now to FIG. 4A, an example portfolio allocation mix for the 2040 TDF 70B at month one-hundred twenty-two (122) is illustrated. As shown in the FIG. 4A example, the glide path 70 defines that the 2040 TDF 70B includes seven (7) different underlying funds 74 each weighted separately based on a point in along the glide path 70. For example, as shown in the FIG. 4A, at month one-hundred twenty-two (122), the 2045 TDF 70B portfolio includes a 'Family 1 Large Capitalization fund' 74A that is approximately thirty percent (30%) 74C of the total portfolio allocation, and a 'Family 1 Government Bond Fund' 74B is approximately two percent (2%) 74D of the total portfolio allocation.

Referring now to FIG. 4B, an example portfolio allocation mix for the 2015 TDF 70G is illustrated. As shown in the FIG. 4B example, a larger proportion of the 2015 TDF 70G portfolio 74 is weighted in fixed income securities, rather than equity based securities. For example, as shown in FIG. 4B, at month three hundred and sixty eight (368), the 'Family 1 Large Capitalization fund' 74A is approximately fifteen percent (15%) 74C of the total portfolio funds 74 and the 'Family 1 Government Bond Fund' 74B is approximately fifteen percent (15%) 74D of the total portfolio 74.

Advantageously, in several implementations, the risk module 40 provides glide path as well as underlying funds information, such as fund weighting information and asset classification information, to a user for further analysis of TDF dynamics.

Referring back to FIG. 2, once the risk module 32 determines the glide path for the series, the classification module 30 categorizes the underlying funds of each of the series of TDFs 54. The classification module 30 categorizes each of the underlying funds into one of several asset classifications based on characteristics of the assets comprising each underlying fund. In one implementation, for example, the classification module 30 queries the data store 42 for asset information (e.g., holdings data) of each underlying fund and then associates characteristics of the holdings data with one of a plurality of pre-defined asset classification types.

Figure 5:
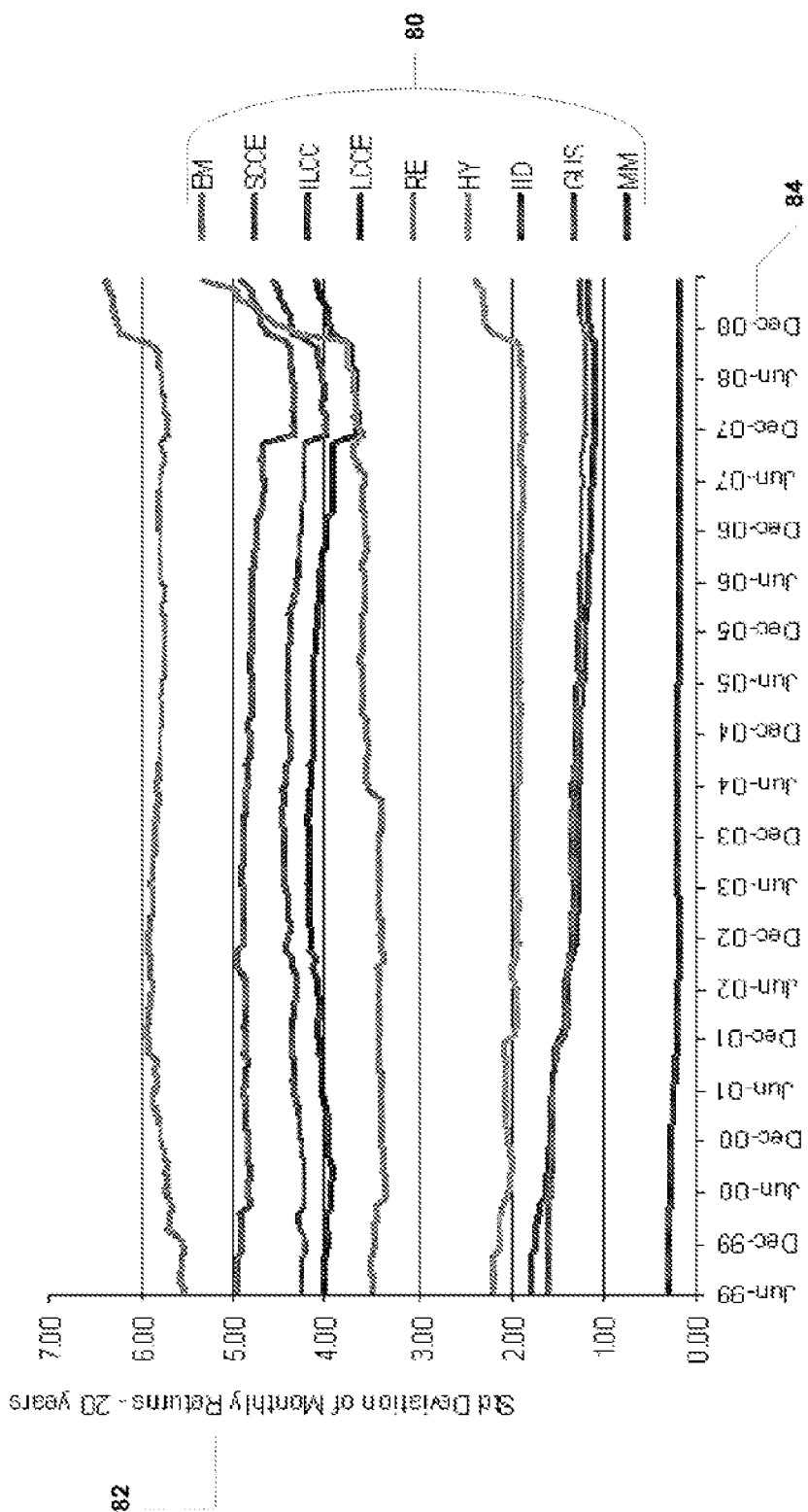
FIG. 5 illustrates exemplary historical returns for asset classifications.

Next, once the classification module 30 determines asset classifications, the risk module 32 calculates a historical risk profile for each of the identified asset classifications 56. In some implementations, for example, the risk module 32 generates historical rate of return values for each identified classification of each TDF in the series of TDFs. For example, in one implementation, as shown in FIG. 5, the risk module 32 generates historical rate of return values by computing a standard deviation of monthly asset classification returns 82 generated over a twenty year (20) time interval 84 for identified asset classifications 80.

Once the risk module 32 determines the historical returns for each of the asset classifications over the time interval, the risk module 32 estimates the historical relationship between risk and return for each asset classification included in the series 56. In one implementation, the risk module 32 averages the monthly returns 88 and standard deviation of monthly returns 86, from FIG. 6, for each of the asset classifications, and then determines the relationship between the averages.

Figure 6:
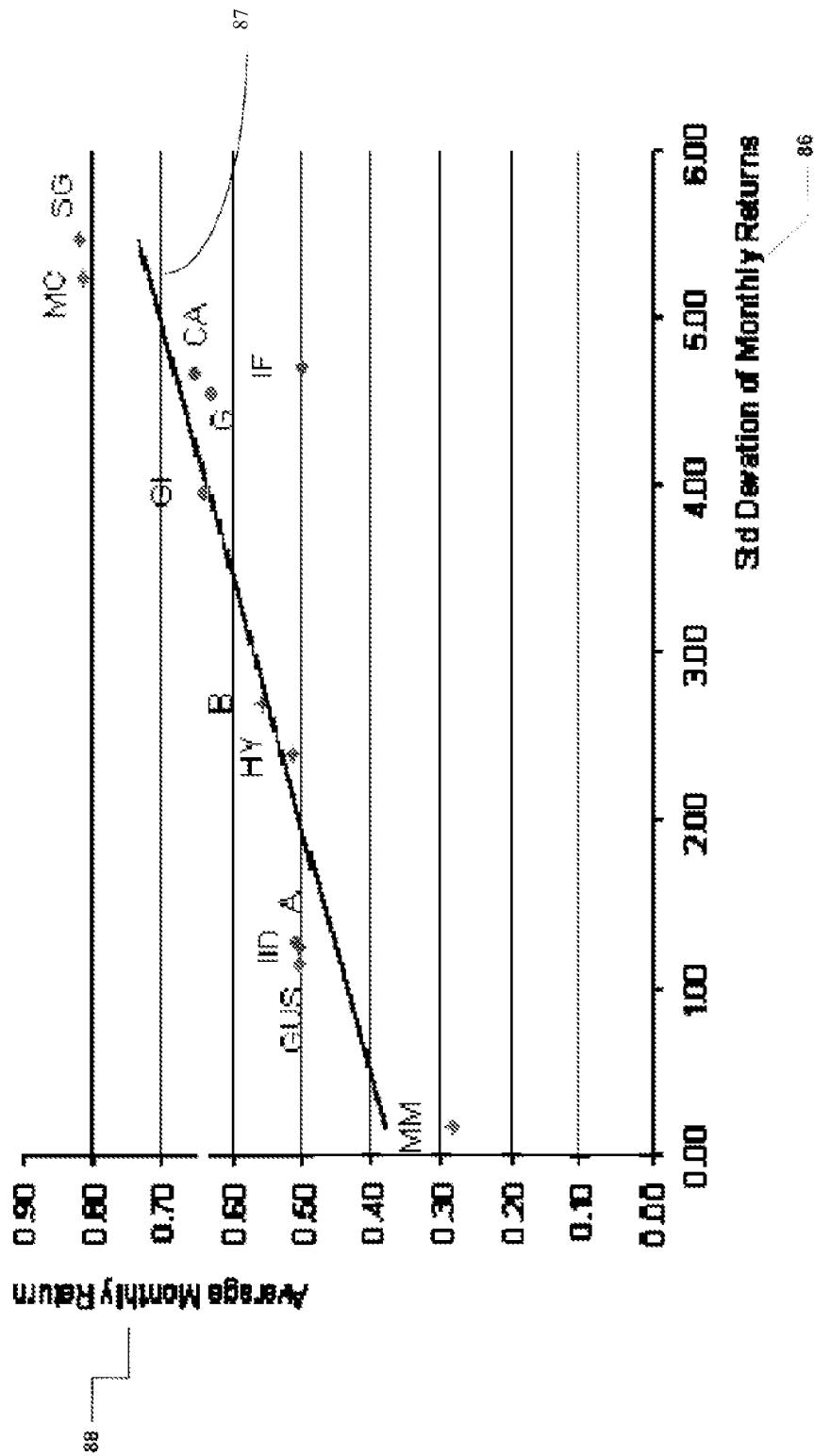
FIG. 6 illustrates exemplary asset classification returns and risk levels.

For example, in some implementations, turning now to FIG. 6, the risk module 32 determines the relationship between average returns and standard deviation of returns by regressing the averaged monthly asset classification returns 88 on the averaged standard deviation of monthly returns 86 using a regression technique. In one implementation, for example, the risk module 32 uses a linear regression technique to determine the relationship. In one implementation, as shown in FIG. 6, the risk module 32 depicts the risk and reward relationship in the form of a regression line 87, which is displayed graphically to a user of the system 10. For example, in one implementation, the regression line 87 is displayed on the browser 12A of the access device 12 shown in FIG. 1. In a non-networked stand alone configuration, the regression line 87 is displayed on a display device of the stand alone computing device.

Referring back to FIG. 2, based on the historical relationship of risk and return, the risk module 32 next computes an expected return for each asset classification 60. As shown in FIG. 7, in one implementation, for example, the risk module 32 first computes a volatility premium 90 and a volatility free rate 92 for the series of TDFs. As used herein the phrase "volatility premium" 90 refers to the amount of additional return expected for each additional unit of risk undertaken. The phrase "volatility free rate" 92 refers to a level of return based on zero (0) volatility. In one implementation, for example, the risk module 32 computes the volatility premium 90 from the slope of the regression line 87 and computes the volatility free rate 92 from an intercept of the regression line 87.

In one implementation, the risk module 32 computes the slope and intercept of the regression line 87 using the following formulas, respectively:

$$\text{Slope of regression line}(b) = (\Sigma XY - (\Sigma X \Sigma Y)/N)/(\Sigma X2 - (\Sigma X)2/N)$$

$$\text{Intercept of regression line}(a) = (\Sigma Y - b(\Sigma X))/N$$

Where:
b=The slope of the regression line
a=The intercept point of the regression line and the y axis.
N=Number of selected investment classifications
X=Standard Deviation of Monthly Returns for investment classifications
Y=Average monthly historical returns for investment classifications
ΣXY=Sum of the product of Standard Deviations and Average Monthly Returns
ΣX=Sum of Standard Deviations
ΣY=Sum of Average Monthly Returns
ΣX2=Sum of squared Standard Deviations Once the volatility premium 90 and volatility free rate 92 are computed for the series of TDFs, the risk module 32 computes an expected return 91 for each asset classification by multiplying the computed volatility premium 90 for the series of TDFs by the averaged standard deviation of return for each asset classification, and then sums the volatility free rate 92 to the multiplied amount.

An example of computing a monthly expected asset classification return for one of a plurality of asset classifications is shown in connection with FIG. 7. In one implementation, for example, the risk module 32 accesses averaged standard deviation of return values 91 for each asset classification from the data store 42. As shown in the FIG. 7 example, the 'International Multi-Cap Core' classification has an averaged standard deviation of return of '4.83'. The risk module 32 then computes the monthly expected return 96 for the 'International Multi-Cap Core' classification by multiplying the averaged standard deviation of return 91 value '4.83' by the computed volatility premium value '0.084' for the series 90. The risk module 32 then adds the computed volatility free rate 92 value of '0.363' to that sum, resulting in a computed expected monthly return 96 of '0.768' for the 'International Multi-Cap Core' classification. In some implementations, as shown in the FIG. 7 example, the risk module 32 is also configured to compute expected annualized returns 98 based on the computed expected monthly returns 96 for each asset classification.

Referring back to FIG. 2, once the risk module 32 computes expected returns for the asset classifications, the portfolio module 36 computes a total portfolio expected return for each time interval along the guide path using the computed expected return classifications 62. In one implementation, the portfolio module 36 applies the computed expected returns generated from the risk module 32 to each interval of the glide path, and then calculates an expected total portfolio return for each time interval using asset classification weights defined by the glide path.

For example, referring now to FIG. 8A, an example expected portfolio return for a series of funds provided by an entity at a first time interval is shown. As explained previously, along each point of a glide path a particular asset allocation mix is defined for a series of TDFs. Accordingly, as shown in the FIG. 8A example, at month one-hundred and twenty two (122) 114, the glide path defines the asset allocation mix in terms of weights 104. As explained previously, in one implementation for each underlying fund of a TDF, the classification module 30 identified an asset classification 102 and the risk module 32 computed both expected monthly returns 106 and expected annualized returns 108 for each asset classification.

Figure 8B:
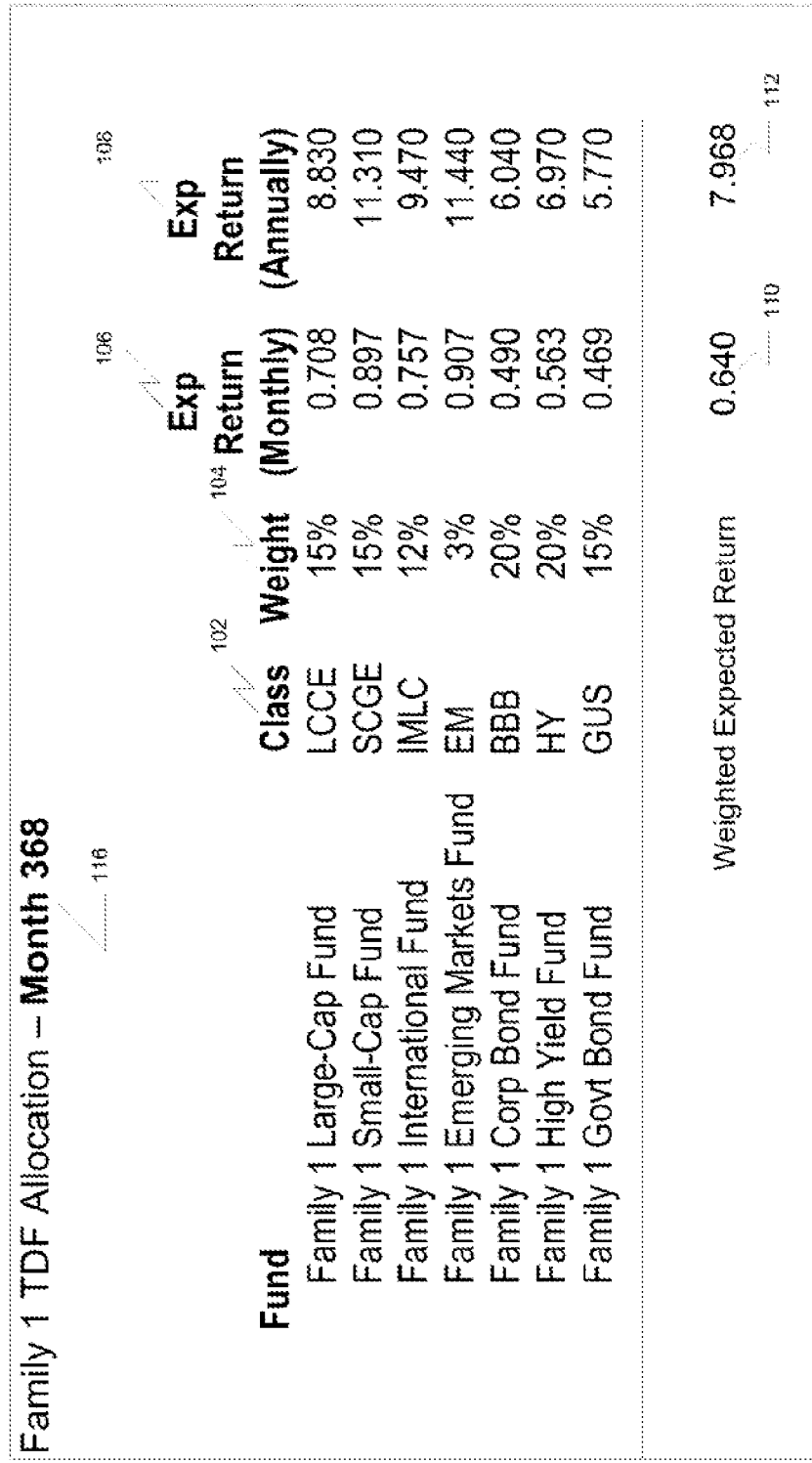

The portfolio module 36 uses the weights 104 and computed expected returns 106, 108 to compute weighted expected portfolio returns 109, which comprises a weighted expected monthly return 110 and a weighted expected annual return 112, along the guide path. For example, as shown in the FIG. 8A example, in one implementation, at month one-hundred and twenty two (122), the portfolio module 36 computes the weighted expected monthly return 110 for the series of TDFs by multiplying the weight 104 associated with each asset classification at month (122) by the corresponding computed expected monthly return 106 for the asset classification at month (122) and then sums these products. Using a similar technique, the portfolio module 36 computes the weighted expected annualized return 112 at month (122) for the series of funds by multiplying the weight 104 associated with each asset classification at month (122) by the corresponding computed expected annualized return 108 for the asset classification at month (122) and then sums these products. FIG. 8B illustrates the same techniques executed by the portfolio module 36 to compute a total portfolio expected return at month three-hundred and sixty eight (368) for the series of funds.

Referring back to FIG. 2, once the portfolio module 36 computes the total portfolio expected returns, the risk module 32 applies the total portfolio expected returns to estimated account balances along the guide path 64. In one implementation, the risk module 32 weights the total portfolio expected returns by estimated account balances for each fund along the glide path. Advantageously, by weighting fund expected returns by estimated account balances, the contribution of returns and actual contributions to account balances over time is obtained.

An example of factors affecting an estimated fund account balance 120 over time is shown in FIG. 9. As shown in the FIG. 9 example, the estimated fund account balance 120 is based at least in part on the amount of contribution 122 provided to the fund and the return of assets 124 underlying the fund. Typically, for a TDF, the amount of contribution 122 provides a much larger percentage of the estimated fund account balance 120 the earlier the fund is from the target date. As the target date approaches, the amount of contributions 122 provided to the fund typically contributes a lesser percentage of total account balance and the return of assets 124 underlying the fund provide a greater percentage of the estimated fund account balance 120.

The participant module 34 of the system 10 determines the amount of contributions 122 provided to the fund over time based on expected contributions to the fund. For example, in one implementation, the participant module 34 bases the amount of contributions 122 on at least one of a contributor salary, a contributor savings rate, a contributor salary increase(s), and/or a contribution schedule for contributors. The contributor salary, contributor salary increase (s), contributor savings rate, and/or contribution schedule can be dynamically defined by a user of the system and/or be included in the request. Alternatively, the contributor salary, contributor salary increase(s), contributor savings rate, and/or contribution schedule are predefined in the system 10. As used herein the term 'contributor' refers to any company, partnership, sole proprietor, or individual that adds value to the fund.

Referring back to FIG. 2, once estimated account balances are applied to total portfolio expected returns, in one implementation, the risk module 32 computes classification return correlations and volatility of return values for each of the funds comprising the series of funds 66. In one implementation, for example, the risk module 32 computes historical correlations between asset classifications over a ten (10) year period and then computes an expected portfolio standard deviation for each of the finds in the target date series. Each of the computed portfolio standard deviations represents a volatility of return value for each fund in the series.

Next, the risk module 32 computes a risk score for the entity by weighting the volatility of return values for each of the funds of the series of funds by estimated account balances of each fund along the guide path, and then summing the weighted volatilities 68. The risk score provides an indication of how aggressive or conservative the investment style of an entity is. An example risk score computation is illustrated in FIG. 10.

Figure 10:
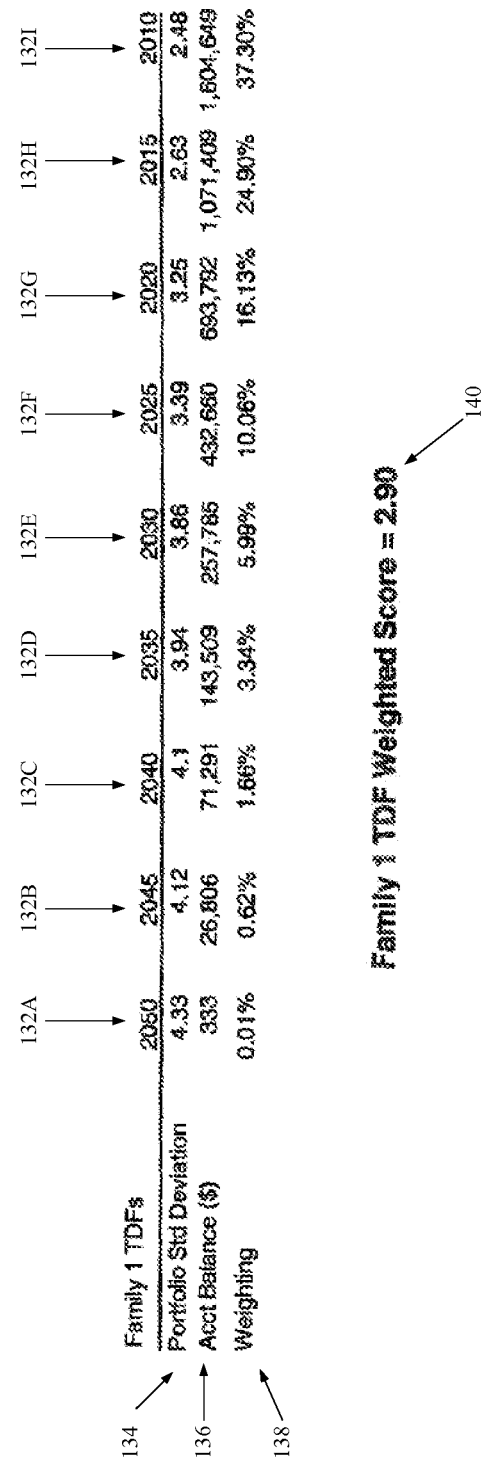
FIG. 10 illustrates a computed risk score for an example entity.

Turning now to the FIG. 10, a plurality of TDFs 132A-132I of a series of TDFs are shown with associated volatility of return values 134 and account balances 136 at a particular point in time. In one implementation, the risk module 132 computes a weighting 138 for each of the funds in the series by dividing the current account balance 136 of each fund by the estimated account balance corresponding to each fund. The risk module 32 then multiples each computed account balance weight 138 by a corresponding volatility of return 134 value (e.g., standard deviation) for each fund, and then sums the weighted volatility of return values for each fund in the series to compute a risk score 140 for the entity.

Once the risk module 32 computes the risk score, the rating module 38 associates the computed risk score with one of a plurality of qualitative identifiers describing an investment style for the entity. In one implementation, for example, the rating module 38 compares the computed risk score to a plurality of pre-defined risk score range values associated with the identifiers, and then determines which of the identifiers to associate with the computed risk score based on the comparison.

For example, referring to now to FIG. 11, an example of a plurality of TDF ratings 142 and pre-defined risk score range values 144 are shown. As shown in the FIG. 11 example, in one implementation, the plurality of TDF ratings 142 include identifiers entitled "Aggressive" 142A, "Moderately Aggressive" 142B, "Moderate" 142C, "Moderately Conservative" 142D, and "Conservative" 142E, each have a corresponding risk score range value 144A-E, respectively. The ratings module 38 compares the computed risk score to each of the risk score range values 144A-E and then associates one of the plurality of identifiers with the computed risk score based on the comparison.

Referring back to FIG. 2, once the risk score is computed, the risk module 32 generates and transmits a signal associated with the risk score in response to the request 69. In one implementation, the transmitted signal includes the computed risk score and corresponding qualitative identifier which are displayed to a user of the system 10 by the display module 40. In some implementations, the signal includes a plurality of computed risk scores and corresponding qualitative identifiers for several different entities.

The display module 40 of the web server 28 may implement various technologies to display contents of the signal depending on system 10 configuration. For example, in one implementation, the display module 40 utilizes eXtensible Markup Language (XML) to display risk scores associated with different entities on the browser 12A of the access device 12. In another implementation, the display module 40 is formed from one or more enterprise java beans (EJBs) that execute and graphically display entity names in an order corresponding to computed risk scores for each entity. For example, as shown in FIG. 12A, in one implementation, the display module 40 plots each entity name 150A-150H on a risk/return scale 152 in an order corresponding to each entity's computed risk score. The display module 40 then displays the plot 150 to a user of the system 10 for comparison purposes. In some implementations, as shown in FIG. 12B, the display module 40 displays one or more risk scores 164 for entities 162 and corresponding qualitative identifiers 166 in a tabular text format 160 on a display device of the server 14. In yet other implementations, the display module 40 displays both the plot of entity names 152 and the tabular text format 160 on a display device of the system 10.

Various features of the system may be implemented in hardware, software, or a combination of hardware and software. For example, some features of the system may be implemented in one or more computer programs executing on programmable computers. Each program may be implemented in a high level procedural or object-oriented programming language to communicate with a computer system or other machine. Furthermore, each such computer program may be stored on a storage medium such as read-only-memory (ROM) readable by a general or special purpose programmable computer or processor, for configuring and operating the computer to perform the functions described above.

What is claimed is:

1. A computer-implemented method comprising:
receiving, by a risk module of a computer, data stored in a relational database, the data associated in the relational database with a series of funds having a common glide path;
identifying, by the risk module of the computer, a first fund from the series of funds, the first fund having the common glide path and a first volatility of return value;
identifying, by the risk module of the computer, a second fund from the series of funds, the second fund having the common glide path and a second volatility of return value, the first fund and the second fund being associated with an entity;
determining, by the risk module of the computer, the first and the second volatility of return values based on historical rate of return values and expected rate of return values associated with asset classifications corresponding to assets underlying the glide path, the asset classifications identified by executing a set of queries on the relational database for each asset in the first and the second funds from the series of funds;

determining, by the risk module of the computer, a volatility premium for each of the first and second funds, the volatility premium comprising the amount of additional return expected for each additional unit of risk undertaken;

determining, by the risk module of the computer, the volatility premium and a volatility free rate for each of the first and second funds using the formulas (b)=$(\Sigma XY-(\Sigma X\Sigma Y)/N)/(\Sigma X^2-(\Sigma X)^2/N)$ and (a)=$(\Sigma Y-b(\Sigma X))/N)$, where b is the slope of the regression line and is the volatility premium, a is the intercept point of the regression line and the y axis and is the volatility free rate, N is the number of selected investment classifications, X is the standard deviation of monthly returns for investment classifications, and Y is the average monthly historical returns for investment classifications;

determining, by the risk module of the computer, a risk score associated with the entity based upon the first volatility of return value and the second volatility of return value, wherein determining the risk score comprises:

weighting, by the risk module of the computer, the first volatility of return value by a corresponding expected account balance for the first fund;

weighting, by the risk module of the computer, the second volatility of return value by a corresponding expected account balance for the second fund; and summing, by the risk module of the computer, the weighted first and second volatility of return values;

automatically associating, by a rating module of the computer, the computed risk score with one of a plurality of identifiers, each identifier identifying an investment style of the entity, the investment style identified from a set of investment styles and corresponding to a risk score range, and storing the computed risk score and associated identifier in the relational database;

generating, by the risk module of the computer, a signal associated with the risk score and the associated one of the plurality of identifiers;

transmitting, by the risk module of the computer, the signal for display by a display module; and displaying, by the display module, the determined risk score, the associated identifier, and the entity on a display device graphically in a graphical user interface generated by one or both of eXtensible Markup Language (XML) or enterprise java beans (EJBs) in a plot format and in a tabular format.

2. The method of claim 1, further comprising generating, by the risk module of the computer, the historical rate of return values by computing a standard deviation of asset classification returns for each of the asset classifications over a time interval.

3. The method of claim 2, comprising:

averaging, by the risk module of the computer, the computed standard deviation of asset classification returns for each asset classification over the time interval;

averaging, by the risk module of the computer, asset classification returns for each asset classification over the time interval; and determining, by the risk module of the computer, the volatility premium and the volatility free rate for each of the first and second funds using the averaged asset classification returns, averaged standard deviation of asset classification returns, and a data regression technique.

4. The method of claim 3, further comprising determining, by the risk module of the computer, the expected rate of return values for each asset classification by multiplying the computed volatility premium by the averaged standard deviation of asset classification returns, and summing the volatility free rate to the multiplied amount.

5. The method of claim 3, wherein the expected rate of return values are annualized values.

6. The method of claim 3, further comprising calculating, by a portfolio module of the computer, a weighted average expected return along the time interval of the glide path by multiplying the calculated expected rate of return values of each asset classification by a proportion of the asset classification allocated in each fund over the time interval; and summing, by a portfolio module of the computer, the multiplied amounts.

7. The method of claim 1, comprising classifying, by a classification module of the computer, the assets underlying the glide path to determine the asset classifications.

8. The method of claim 1, wherein the first fund is a first TDF and the second fund is a second TDF, both the first TDF and the second TDF comprising a plurality of mutual funds.

9. The method of claim 1, further comprising displaying, by the display module, a plurality of computed risk scores associated with different entities on a display device graphically.

10. The method of claim 1, wherein the plurality of identifiers are associated, by the rating module of the computer, with a predetermined range of risk scores.

11. The method of claim 1, wherein one of the plurality identifiers is a text string comprising "Aggressive", "Moderately Aggressive", "Moderate", "Moderately Conservative", and "Conservative".

12. The method of claim 1, wherein the expected account balance is based on at least one of participant salary, participant savings rate, participant salary increase rates, and contribution schedule.

13. The method of claim 1, wherein the first fund and the second fund comprise a series of funds.

14. A system comprising:

a server including a processor and memory storing instructions that, in response to receiving a request for access to a service, cause the processor to:

receive, by a risk module of the server, data stored in a relational database, the data associated in the relational database with a series of funds having a common glide path;

identify, by the risk module of the server, a first fund from the series of funds, the first fund having the common glide path and a first volatility of return value;

identify, by the risk module of the server, a second fund from the series of funds, the second fund having the common glide path and a second volatility of return value, the first fund and the second fund being associated with an entity;

determine, by the risk module of the server, the first and the second volatility of return values based on historical rate of return values and expected rate of return values associated with asset classifications corresponding to assets underlying the glide path from the data repository, the asset classifications identified by executing a set of queries on the data repository for each asset in the first and the second funds from the series of funds;

determine, by the risk module of the server, a volatility premium for each of the first and second funds, the volatility premium comprising the amount of additional return expected for each additional unit of risk undertaken;

compute, by the risk module of the server, the volatility premium and a volatility free rate for each of the first and second funds using the formulas (b)=(ΣXY−(ΣXΣY)/N)/(ΣX²−(ΣX)²/N) and (a)=(ΣY−b(ΣX))/N), where b is the slope of the regression line and is the volatility premium, a is the intercept point of the regression line and the y axis and is the volatility free rate, N is the number of selected investment classifications, X is the standard deviation of monthly returns for investment classifications, and Y is the average monthly historical returns for investment classifications;

determine, by the risk module of the server, a risk score associated with the entity based upon the first volatility of return value and the second volatility of return value, wherein the risk module of the server is further configured to weight the first volatility of return value by a corresponding expected account balance for the first fund, weight the second volatility of return value by a corresponding expected account balance for the second fund, and sum the weighted first and second volatility of return values in determining the risk score associated with the entity;

automatically associate, by a rating module of the server, the computed risk score with one of a plurality of identifiers, each identifier identifying an investment style of the entity, the investment style selected from a set of investment styles and corresponding to a risk score range, and storing the computed risk score and associated identifier in the relational database;

generate, by the risk module of the server, a signal associated with the risk score and the associated one of the plurality of identifiers;

transmit, by the risk module of the server, the signal for display by a display module; and display, by the display module, the determined risk score, the associated identifier, and the entity on a display device graphically in a graphical user interface generated by one or both of eXtensible Markup Language (XML) or enterprise java beans (EJBs) in a plot format and in a tabular format.

15. The system of claim 14 wherein the memory stores instructions that, in response to receiving the request, cause the processor to generate, by the risk module of the server, the historical rate of return values by computing a standard deviation of asset classification returns for each of the asset classifications over a time interval.

16. The system of claim 15 wherein the memory stores instructions that, in response to receiving the request, cause the processor to:

average, by the risk module of the server, the computed standard deviation of asset classification returns for each asset classification over the time interval;

average, by the risk module of the server, asset classification returns for each asset classification over the time interval; and compute, by the risk module of the server, the volatility premium and the volatility free rate for each of the first and second funds using the averaged asset classification returns, averaged standard deviation of asset classification returns, and a data regression technique.

17. The system of claim 16 wherein the memory stores instructions that, in response to receiving the request, cause the processor to compute, by the risk module of the server, the expected rate of return values for each asset classification by multiplying the computed volatility premium by the averaged standard deviation of asset classification returns, and summing the volatility free rate to the multiplied amount.

18. The system of claim 16 wherein the memory stores instructions that, in response to receiving the request, cause the processor to annualize, by the risk module of the server, monthly expected rate of return values.

19. The system of claim 16 wherein the memory stores instructions that, in response to receiving the request, cause the processor to:

multiply, by a portfolio module of the server, the calculated expected rate of return values of each asset classification by a proportion of the asset classification allocated in each fund over the time interval; and sum, by the portfolio module of the server, the multiplied amounts to compute a weighted average expected return for each time interval along the glide path.

20. The system of claim 14 wherein the memory stores instructions that, in response to receiving the request, cause the processor to classify, by a classification module of the server, the assets underlying the glide path to determine the asset classifications.

21. The system of claim 14, wherein the first fund is a first TDF and the second fund is a second TDF, both the first TDF and the second TDF comprising a plurality of mutual funds.

22. The system of claim 14 wherein the memory stores instructions that, in response to receiving the request, cause the processor to display, by the display module of the server, a plurality of computed risk scores associated with different entities on the display device graphically.

23. The system of claim 14 wherein the memory stores instructions that, in response to receiving the request, cause the processor to associate, by the rating module of the server, each of the plurality of identifiers with a predetermined range of risk scores.

24. The system of claim 14 wherein the memory stores instructions that, in response to receiving the request, cause the processor to associate, by the rating module of the server, one of the plurality identifiers with a text string comprising "Aggressive", "Moderately Aggressive", "Moderate", "Moderately Conservative", and "Conservative".

25. The system of claim 14 wherein the memory stores instructions that, in response to receiving the request, cause the processor to determine, by the risk module of the server, the expected account balance based on at least one of participant salary, participant savings rate, participant salary increase rates, and contribution schedule.

26. The system of claim 14, wherein the first fund and the second fund comprise a series of funds.

27. An article comprising a non-transitory machine-readable medium storing machine-readable instructions that, when applied to the machine, cause the machine to:

receive, by a risk module of the machine, data stored in a relational database, the data associated in the relational database with a series of funds having a common glide path;

identify, by the risk module of the machine, a first fund from the series of funds, the first fund having the common glide path and a first volatility of return value;

identify, by the risk module of the machine, a second fund from the series of funds, the second fund having the common glide path and a second volatility of return value, the first fund and the second fund being associated with an entity;

determine, by the risk module of the machine, the first and second volatility of return values based on historical rate of return values and expected rate of return values associated with asset classifications corresponding to assets underlying the glide path, the asset classifications identified by executing a set of queries on the relational database for each asset of the first and the second funds from the series of funds;

determine, by the risk module of the machine, a volatility premium for each of the first and second funds, the volatility premium comprising the amount of additional return expected for each additional unit of risk undertaken;

compute, by the risk module of the machine, the volatility premium and a volatility free rate for each of the first and second funds using the formulas $(b)=(\Sigma XY-(\Sigma X\Sigma Y)/N)/(\Sigma X^2-(\Sigma X)^2/N)$ and $(a)=(\Sigma Y-b(\Sigma X))/N)$, where b is the slope of the regression line and is the volatility premium, a is the intercept point of the regression line and the y axis and is the volatility free rate, N is the number of selected investment classifications, X is the standard deviation of monthly returns for investment classifications, and Y is the average monthly historical returns for investment classifications;

determine, by the risk module of the machine, a risk score associated with the entity based upon the first volatility of return value and the second volatility of return value, wherein the risk module of the server is further configured to weight the first volatility of return value by a corresponding expected account balance for the first fund, weight the second volatility of return value by a corresponding expected account balance for the second fund, and sum the weighted first and second volatility of return values in determining the risk score associated with the entity;

automatically associate, by a rating module of the machine, the computed risk score with one of a plurality of identifiers, each identifier identifying an investment style of the entity, the investment style selected from a set of investment styles and corresponding to a risk score range, and store the computed risk score and associated identifier in the relational database;

generate, by the risk module of the machine, a signal associated with the risk score and the associated one of the plurality of identifiers;

transmit, by the risk module of the machine, the signal to a display module for display; and display, by the display module, the determined risk score, the associated identifier, and the entity on a display device graphically in a graphical user interface generated by one or both of eXtensible Markup Language (XML) or enterprise java beans (EJBs) in a plot format and in a tabular format.

28. The article of claim 27 including instructions that, when applied to the machine, cause the machine to generate, by the risk module of the machine, the historical rate of return values by computing a standard deviation of asset classification returns for each of the asset classifications over a time interval.

29. The article of claim 28 including instructions that, when applied to the machine, cause the machine to:

average, by the risk module of the machine, the computed standard deviation of asset classification returns for each asset classification over the time interval;

average, by the risk module of the machine, asset classification returns for each asset classification over the time interval; and compute, by the risk module of the machine, the volatility premium and the volatility free rate for each of the first and second funds using the averaged asset classification returns, averaged standard deviation of a set classification returns, and a data regression technique.

30. The article of claim 29 including instructions that, when applied to the machine, cause the machine to compute, by the risk module of the machine, the expected rate of return values for each asset classification by multiplying the computed volatility premium by the averaged standard deviation of asset classification returns, and summing, by the risk module of the machine, the volatility free rate to the multiplied amount.

31. The article of claim 29 including instructions that, when applied to the machine, cause the machine to annualize, by the risk module of the machine, monthly expected rate of return values.

32. The article of claim 29 including instructions that, when applied to the machine, cause the machine to:

multiply, by a portfolio module of the machine, the calculated expected rate of return values of each asset classification by a proportion of the asset classification allocated in each fund over the time interval; and sum, by the portfolio module of the machine, the multiplied amounts to compute a weighted average expected return for each time interval along the first and second glide paths.

33. The article of claim 27 including instructions that, when applied to the machine, cause the machine to classify, by a classification module of the machine, the assets underlying the glide path to determine the asset classifications.

34. The article of claim 27, wherein the first fund is a first TDF and the second fund is a second TDF, both the first TDF and the second TDF comprising a plurality of mutual funds.

35. The article of claim 27 including instructions that, when applied to the machine, cause the machine to display, by the display module of the machine, a plurality of computed risk scores associated with different entities on a display device graphically.

36. The article of claim 27 including instructions that, when applied to the machine, cause the machine to associate, by the rating module of the machine, each of the plurality of identifiers with a predetermined range of risk scores.

37. The article of claim 27 including instructions that, when applied to the machine, cause the machine to associate, by the rating module of the machine, one of the plurality identifiers with a text string comprising "Aggressive", "Moderately Aggressive", "Moderate", "Moderately Conservative", and "Conservative".

38. The article of claim 27 including instructions that, when applied to the machine, cause the machine to determine, by the risk module of the machine, the expected account balance based on at least one of participant salary, participant savings rate, participant salary increase rates, and contribution schedule.

39. The article of claim 27, wherein the first fund and the second fund comprise a series of funds.

* * * * *